Patented Nov. 10, 1953

2,658,920

UNITED STATES PATENT OFFICE 2,658,920

PROCESS FOR THE MANUFACTURE OF BENZIL

David X. Klein, Upper Montclair, Theodore A. Girard, Clifton, and Hilding R. Johnson, Glen Rock, N. J., assignors to Heyden Chemical Corporation, New York, N. Y., a corporation of Delaware No Drawing. Application August 24, 1951, Serial No. 243,598

10 Claims. (Cl. 260—590)

This invention relates to benzil, and more specifically, to a new and improved method for the preparation of benzil by the oxidation of benzoin.

Conventional methods for the preparation of benzil involve the oxidation of the alpha hydroxy ketone, i. e. benzoin, by a variety of well-known procedures. The following equation represents the basic operation of these processes:

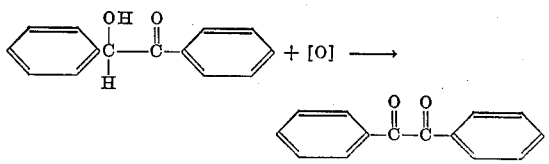

The processes for the preparation of benzoin differ somewhat in the type of oxidizing agents used. The most common oxidizing agents include concentrated nitric acid, air in the presence of a copper sulfate catalyst dissolved in a pyridine solution, and ammonium nitrate in the presence of cupric acetate dissolved in an acetic acid solution.

The last indicated method, that is, oxidation by ammonium nitrate in the presence of cupric acetate dissolved in an acetic acid solution, is preferred not only because of the economy and simplicity of procedure, but also, because of the high quality of the desired substance produced therefrom. In this process, the cupric acetate oxidizes the benzoin to form benzil and cuprous acetate. The reduced cuprous acetate is in turn oxidized by the ammonium nitrate, cupric acetate thereby being regenerated. The cupric acetate is then available for the oxidation of further quantities of benzoin. The ammonium nitrate is reduced to ammonium nitrite, the latter substance decomposing in aqueous acetic acid with the formation of gaseous nitrogen and water.

The above indicated reactions can be represented by the following equations:

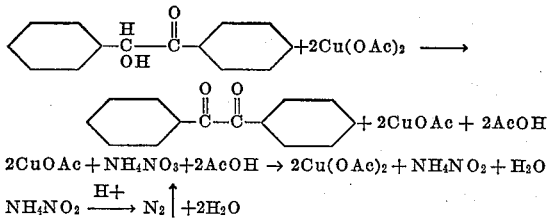

$2CuOAc + NH_4NO_3 + 2AcOH \rightarrow 2Cu(OAc)_2 + NH_4NO_2 + H_2O$ $NH_4NO_2 \xrightarrow{H+} N_2 \uparrow + 2H_2O$ In order that the above indicated reactions may proceed in the manner indicated, the cupric acetate must be reduced to cuprous acetate to make it available for oxidation by the ammonium nitrate. During operations, the reduction of cupric acetate to cuprous oxide (which is red in color) can be occasionally observed. This reduction is accompanied or evidenced by the change in the color of the solution from a dark green to orange red. When the cupric acetate is thus reduced, the oxidation reaction stops abruptly. On further heating, reactivation of the catalyst may sometimes occur. When the catalyst is thus reactivated, the solution will suddenly turn green, the reactivation being accompanied by a violent reaction wherein large volumes of nitrogen gas are given off. The disadvantages and hazards of operating under such uncontrolled conditions are quite apparent.

It has now been discovered that the reaction can be effectively controlled by the addition of a small quantity of a soluble inorganic alkaline-nitrate to the reaction mixture thereby preventing the cupric acetate from being reduced to the inactive, reddish-colored, cuprous oxide. Even if the cupric acetate has been reduced to the oxide form, the addition of the alkaline-nitrite will cause an immediate reactivation of the copper catalyst.

Compounds included in the term "soluble inorganic alkaline nitrite," are sodium nitrite, potassium nitrite, magnesium nitrite, ammonium nitrite, etc.

The mechanism of this reaction involving the addition of a soluble inorganic alkaline-nitrite is not completely understood. It is believed however that the alkaline-nitrite compound acts as a modified oxidizing agent and thus prevents the cupric acetate from being reduced to cuprous oxide.

In a more specific embodiment of this invention, a mixture containing benzoin, an aqueous acetic acid solution, ammonium nitrate, cupric acetate, and a soluble inorganic alkaline-nitrite, such as for example sodium nitrite, is heated to a temperature varying between 85°–90° C. and maintained within this range. Within this temperature range, the solution is clear and dark green in color. The reaction is accompanied by the vigorous evolution of nitrogen gas. In order to prevent any violent or uncontrolled reactions, the temperature is prevented from rising beyond about 90° C. by the application of cooling water. After reacting the mixture for about one hour at a temperature of about 90° C., the reaction is essentially completed so that the mixture may be refluxed at a temperature of about 107° C. and maintained at that temperature for about one and one-half hours in order to complete the oxidation.

While the procedure indicated above can be satisfactorily conducted on a laboratory, or a small scale level, the reaction may become hazardous and uncontrollable when operated on a large production scale since it is very difficult if not impossible to apply cooling water to the reactor with sufficient speed and effectiveness to prevent a sudden temperature rise beyond about 90° C. A sudden temperature rise would result in a violent and uncontrollable reaction. However, the danger of a violent and uncontrollable reaction may be eliminated by a modification of the above described procedure wherein the reactants are mixed at room temperature in a vessel equipped with an efficient agitator. An aliquot portion of this mixture is added to a conventional glass-lined reaction vessel and is then heated to a temperature of 90° C. Because of the small volume of the mixture which is being reacted in the vessel, the temperature may be controlled without any difficulty. The remainder of the reaction mixture is then added continuously to the reactor over a period of about one hour while the temperature in the reactor is maintained within the range of 90°–95° C. by the application of either cooling water or heat, whichever may be required. Since the portions thus added react immediately upon being poured into the vessel, there is little or no accumulation of unreacted material thereby completely eliminating the possibility of sudden reaction of large quantities of the reactant materials.

For the purpose of this invention, the term, aliquot portion, is defined as a quantity equal to about one-eighth of the reaction mixture.

Additional advantages and features of this new and highly improved process are set forth in the following example which discloses the principle of the invention and the preferred embodiment of applying that principle. It is understood, however, that the example is merely illustrative and not limitative in nature, being capable of various other modifications.

*Example*

The process is operated as follows:
Into a suitable vessel equipped wtih a stirrer and a bottom outlet is added:

424 parts of benzoin
1176 parts of glacial acetic acid
280 parts of water
200 parts of ammonium nitrate
4 parts of cupric acetate
2 parts of sodium nitrite Approximately one-eighth of the mixture is added to a reaction vessel equipped with an agitator, thermometer, and condenser. The mixture is heated to 90° C. While the temperature is maintained at 90°–95° C., the remainder of the reaction liquor is added continuously to the reactor over a period of 60–90 minutes. When the last of the liquor has been added, the charge is heated to reflux temperature and refluxed for 1.5 hours. The mixture is cooled to 20° C., filtered and washed with water until the filtrate is neutral (pH 6–7). The product is dried at 80° C. A yield of 395 g. or 94% of theory based on the benzoin charged is obtained.

The amount of sodium nitrite which can be used varies between 0.138 g. and 2 g. per mol of benzoin charged. At this concentration, the course of the reaction is neither adversely affected nor the desired effect of the treatment impaired. A quantity of 1 g. of sodium nitrite per mol of benzoin is preferred however.

While the above example has described the use of sodium nitrite in the preparation of benzoin, similar results are likewise obtained by the use of other soluble inorganic alkaline-nitrites such as potassium nitrite, magnesium nitrite, ammonium nitrite.

It is obvious from the foregoing that the invention is capable of various modifications and that, therefore, it is intended and desired to embrace within the scope of this invention such modifications and changes that are necessary to adapt it to varying conditions and uses, as defined by the scope of the appended claims.

We claim:

1. The process of producing benzil from benzoin comprising the steps of adding together benzoin, acetic acid, ammonium nitrate, cupric acetate, water, and a soluble inorganic alkaline-nitrite, and then reacting the mixture while maintaining the mixture within a temperature range of 85°–95° C., thereby converting benzoin to benzil.

2. The process of producing benzil from benzoin comprising the steps of adding together benzoin, acetic acid, ammonium nitrate, cupric acetate, water, and sodium nitrite, and then reacting the mixture while maintaining the mixture within a temperature range of 85°–95° C., thereby converting benzoin to benzil.

3. The process of producing benzil from benzoin comprising the steps of adding together benzoin, acetic acid, ammonium nitrate, cupric acetate, water, and potassium nitrite, and then reacting the mixture while maintaining the mixture within a temperature range of 85°–95° C., thereby converting benzoin to benzil.

4. The process of producing benzil from benzoin comprising the steps of adding together benzoin, acetic acid, ammonium nitrate, cupric acetate, water, and ammonium nitrite, and then reacting the mixture while maintaining the mixture within the temperature range of 85°–95° C., thereby converting benzoin to benzil.

5. The process of producing benzil from benzoin comprising the steps of adding together benzoin, acetic acid, ammonium nitrate, cupric acetate, water, and magnesium nitrate, and then reacting the mixture while maintaining the mixture within a temperature range of 85°–95° C., thereby converting benzoin to benzil.

6. The process of producing benzil from benzoin comprising the steps of preparing a mixture by adding together benzoin, acetic acid, ammonium nitrate, cupric acetate, water, and a soluble inorganic alkaline-nitrite, reacting an aliquot portion of the prepared mixture, and then adding the remainder of the prepared mixture to the aliquot portion and continuing reacting the mixture, the reaction mixture being maintained within a temperature range of 90–95° C.

7. The process of producing benzil from benzoin comprising the steps of preparing a mixture by adding together benzoin, acetic acid, ammonium nitrate, cupric acetate, water, and sodium nitrite, reacting an aliquot portion of the prepared mixture, and then adding the remainder of the prepared mixture to the aliquot portion and continuing reacting the mixture, the reaction mixture being maintained within a temperature range of 90°–95° C.

8. The process of producing benzil from benzoin comprising the steps of preparing a mixture by adding together benzoin, acetic acid, ammonium nitrate, cupric acetate, water, and potassium nitrite, reacting an aliquot portion of the prepared mixture, and then adding the remainder of the prepared mixture to the aliquot portion and continuing reacting the mixture, the reaction mixture being maintained within a temperature range of 90°–95° C.

9. The process of producing benzil from benzoin comprising the steps of preparing a mixture by adding together benzoin, acetic acid, ammonium nitrate, cupric acetate, water, and ammonium nitrite, reacting an aliquot portion of the prepared mixture, and then adding the remainder of the prepared mixture to the aliquot portion and continuing reacting the mixture, the reaction mixture being maintained within a temperature range of 90°–95° C.

10. The process of producing benzil from benzoin comprising the steps of preparing a mixture by adding together benzoin, acetic acid, ammonium nitrate, cupric acetate, water, and magnesium nitrite, reacting an aliquot portion of the prepared mixture, and then adding the remainder of the prepared mixture to the aliquot portion and continuing reacting the mixture, the reaction mixture being maintained within a temperature range of 90°–95° C.

DAVID X. KLEIN.
THEODORE A. GIRARD.
HILDING R. JOHNSON.

References Cited in the file of this patent
Weiss et al., "Jour. Am. Chem. Soc.," vol. 70, pages 3666–7 (1948).